US012627382B2

(12) United States Patent
Fukumoto et al.

(10) Patent No.: US 12,627,382 B2
(45) Date of Patent: May 12, 2026

(54) RECEIVING APPARATUS AND RECEIVING METHOD

(71) Applicant: NTT, Inc., Tokyo (JP)

(72) Inventors: Hiroyuki Fukumoto, Musashino (JP); Yosuke Fujino, Musashino (JP); Toshimitsu Tsubaki, Musashino (JP); Miharu Oiwa, Musashino (JP); Yuya Ito, Musashino (JP); Marina Nakano, Musashino (JP)

(73) Assignee: NTT, Inc., Tokyo (JP)

( * ) Notice: Subject to any disclaimer, the term of this patent is extended or adjusted under 35 U.S.C. 154(b) by 191 days.

(21) Appl. No.: 18/290,470

(22) PCT Filed: May 19, 2021

(86) PCT No.: PCT/JP2021/018901
§ 371 (c)(1),
(2) Date: Nov. 14, 2023

(87) PCT Pub. No.: WO2022/244125
PCT Pub. Date: Nov. 24, 2022

(65) Prior Publication Data
US 2024/0259111 A1      Aug. 1, 2024

(51) Int. Cl.
*H04B 11/00*      (2006.01)
*H04L 25/02*      (2006.01)
(52) U.S. Cl.
CPC .......... *H04B 11/00* (2013.01); *H04L 25/0212* (2013.01)
(58) Field of Classification Search
CPC .......... H04B 11/00; H04B 13/02; H04B 1/06; H04L 25/0212
See application file for complete search history.

(56) References Cited

U.S. PATENT DOCUMENTS 5,784,339 A  *  7/1998  Woodsum .............. H04B 11/00
                                              367/134
6,157,403 A    12/2000  Nagata
(Continued)

FOREIGN PATENT DOCUMENTS

JP         H02-141134 A    5/1990
JP         H10-051268 A    2/1998
(Continued)

OTHER PUBLICATIONS

Robert S. H. Istepanian et al., "Underwater Acoustic Digital Signal Processing and Communication Systems", Springer Science + Business Media, LLC, 2002.
(Continued)

*Primary Examiner* — Daniel L Murphy
*Assistant Examiner* — Amie M Ndure
(74) *Attorney, Agent, or Firm* — Harness, Dickey & Pierce, P.L.C.

(57)      ABSTRACT

A receiver including a plurality of wave receivers that receive signals arriving from a predetermined direction, a plurality of detection units that is connected to at least some of the plurality of wave receivers and detect arrival times of signals received by a connected wave receivers, and a plurality of adjustment units that adjust a deviation between arrival times of the plurality of wave receivers based on arrival times or arrival directions of the plurality of detected signals.

6 Claims, 11 Drawing Sheets

(56) References Cited

U.S. PATENT DOCUMENTS

| | | | | |
|---|---|---|---|---|
| 6,980,487 | B2 * | 12/2005 | Davies | H04B 13/02 |
| | | | | 367/134 |
| 7,362,799 | B1 | 4/2008 | Petrus | |
| 9,118,361 | B2 | 8/2015 | Barker et al. | |
| 11,750,299 | B2 * | 9/2023 | Fukumoto | H04B 11/00 |
| | | | | 367/134 |
| 12,231,180 | B2 * | 2/2025 | Fujino | H04B 11/00 |
| 2011/0141853 | A1 * | 6/2011 | Megdal | G01S 5/30 |
| | | | | 367/117 |
| 2013/0155809 | A1 * | 6/2013 | L'Her | G01S 11/14 |
| | | | | 367/19 |
| 2014/0126334 | A1 * | 5/2014 | Megdal | H04B 11/00 |
| | | | | 367/117 |
| 2016/0050030 | A1 * | 2/2016 | Riedl | H04Q 9/00 |
| | | | | 367/133 |
| 2019/0068273 | A1 | 2/2019 | Ito et al. | |
| 2019/0394742 | A1 | 12/2019 | Xu et al. | |
| 2022/0271848 | A1 * | 8/2022 | Fukumoto | H04L 25/0224 |

FOREIGN PATENT DOCUMENTS

| | | |
|---|---|---|
| JP | 2012-169928 A | 9/2012 |
| WO | 2021/001870 A1 | 1/2021 |

OTHER PUBLICATIONS

Hiroyuki Fukumoto et al., "A Study on Spatio-Temporal Equalization for High Speed Underwater Acoustic Communications", IEICE Technical Report, vol. 119, No. 296, RCS2019-233, pp. 169-174, Nov. 2019.

Dessalermos Spyridon: "Adaptive Reception, for Underwater Communications", Doctoral Dissertation, Naval Postgraduate School, Jun. 1, 2011.

Fukumoto Hiroyuki et al: "Field Experiments Demonstrating Mbps-Class Underwater Acoustic Communication with Spatio-Temporal Equalization", Global Oceans 2020: Singapore—U.S. Gulf Coast, IEEE, Oct. 5, 2020, pp. 1-6.

* cited by examiner

| KNOWN SIGNAL | PAYLOAD |
|---|---|

FIG. 3

RECEIVING APPARATUS AND RECEIVING METHOD

CROSS-REFERENCE TO RELATED APPLICATIONS

This application is a 371 U.S. National Phase of International Application No. PCT/JP2021/018901, filed on May 19, 2021. The entire disclosure of the above application is incorporated herein by reference.

TECHNICAL FIELD

The present invention relates to a receiver and a receiving method.

BACKGROUND ART

As conventionally known, absorption and attenuation of radio waves in water are extremely large, Therefore, it is difficult to perform wireless communication using radio waves in the same way as on the land. Therefore, a sound wave of 1 MHz or less having relatively small absorption attenuation is used for wireless communication in water. As a form of a receiver for underwater communication, there are a method of improving a reception signal-to-noise ratio (SNR) by arranging a plurality of wave receivers in an array, performing finite impulse response (FIR) filtering processing on reception signals received by the respective wave receivers, and combining the signals received by the respective wave receivers (for example, refer to, Non Patent Literature 1), and a method of suppressing a long delay wave (for example, refer to Non Patent Literature 2).

FIG. 10 is a diagram illustrating a configuration of a conventional receiver 100. As illustrated in FIG. 10, the receiver 100 includes a plurality of wave receivers 110-1 to 110-$n$, a plurality of FIR filters 120-1 to 120-$n$, and a synthesis unit 130, Here, n indicates an integer of 2 or more. The wave receivers 110-1 to 110-$n$ receive sound waves coming from the outside. The wave receivers 110-1 to 110-$n$ convert the received sound waves into electric signals and output the electric signals to the FIR filters 120-1 to 120-$n$. The FIR filters 120-1 to 120-$n$ perform FIR filtering processing on the electric signals of the sound waves received by the wave receivers 110-1 to 110-$n$. The synthesis unit 130 synthesizes the electric signals subjected to the FIR filtering processing. As a result, the SNR can be improved and unnecessary waves can be removed.

The propagation speed of sound in water is about 1,500 m/s, which is about 200,000 times slower than the propagation speed of radio waves. Therefore, in the configuration illustrated in FIG. 10, the arrival time difference caused by the path difference between the wave receivers 110-1 to 110-$n$ is 200,000 times larger than the arrival time difference caused by the radio wave. FIG. 11 is a diagram illustrating a relationship between a sound wave arriving from one arrival direction and an impulse response observed by each of the wave receivers 110-1 to 110-$n$. As illustrated in FIG. 11, a path difference occurs between the wave receivers 110-1 to 110-$n$ unless a sound wave arrives from the front.

When the symbol rate of the signal is Fs, the path difference between the wave receiver 110-1 and the wave receiver 110-2 is $\Delta x$, and the propagation speed is c, the reception signal of the wave receiver 110-2 is delayed by Fs$\Delta x$/c symbol with respect to the reception signal of the wave receiver 110-1. For example, in a case where the symbol rate Fs is 100 kHz and the path difference $\Delta x$ is 0.1 m, the delay of radio wave is delayed by $3.3 \times 10^{-5}$ symbols (that is, less than 1 symbol), whereas the underwater sound is delayed by 6.7 symbols. As described above, in the radio wave, in a case where the symbol rate is on the order of GHz or less, the delay between the wave receivers (antennas) is less than one symbol. Therefore, signal processing such as direction separation can be realized only by the phase shifter. On the other hand, in underwater acoustic communication, a delay of 1 symbol or more occurs at a symbol rate of an order of several tens of kHz. Therefore, when signal processing is applied at a symbol rate, it is necessary to consider a delay time difference.

CITATION LIST

Non Patent Literature

Non Patent Literature 1: Robert S. H. Istepanian and Milica Stojanovic, "Underwater Acoustic Digital Signal Processing, and Communication Systems," Springer Science+Business Media, LLC.
Non Patent Literature 2: Hiroyuki Fukumoto, Youske Fujino, Marina Nakano, Toshimitsu Tsubaki, Ikko Sakamoto. "Study on spatiotemporal equalization for speeding up subsea acoustic communication," IEICE Technical Report vol. 119, no. 296, RCS2019-233, pp. 169-174, November 2019.

SUMMARY OF INVENTION

Technical Problem

As described above, in a configuration having a plurality of wave receivers, in order to synthesize sound waves arriving from a certain direction, it is necessary to consider a delay time between the wave receivers. Therefore, as illustrated in FIG. 11, it is necessary to set the tap length of the FIR filter to be larger than the arrival time difference between the wave receivers, and to absorb the delay difference by calculation processing of the FIR filter. When the difference in delay time between the wave receivers is taken into consideration, there is a problem that the number of taps of the FIR filter becomes large and the operation amount becomes large.

Furthermore, in a case where the FIR filter is to be controlled by an adaptive algorithm such as a recursive least square (RLS) method or a least mean square (LMS) method, since the total number of taps of the filter determines the convergence speed, the convergence speed decreases as the number of taps increases, which causes deterioration in compensation performance. However, if the length of the FIR filter is made shorter than the arrival time difference between the wave receivers for the purpose of improving the convergence speed and reducing the amount of calculation, there is a problem that the bit error rate (BER) characteristic of the sound wave from the arrival direction in which the sound wave cannot be synthesized is deteriorated because the arrival direction in which the sound wave cannot be synthesized occurs.

In view of the above circumstances, an object of the present invention is to provide a technique capable of synthesizing signals received by a wave receiver while suppressing the number of taps of an FIR filter.

Solution to Problem

An aspect of the present invention is a receiver including a plurality of wave receivers that receive signals arriving from a predetermined direction, a plurality of detection units that is connected to at least some of the plurality of wave receivers and detect arrival times of signals received by a connected wave receivers, and a plurality of adjustment units that adjust a deviation between arrival times of the plurality of wave receivers based on arrival times or arrival directions of the plurality of detected signals.

An aspect of the present invention is a receiving method including receiving a signal arriving from a predetermined direction, detecting an arrival time of at least some of the received signals, and adjusting a deviation between arrival times of the plurality of wave receivers based on arrival times or arrival directions of the plurality of detected signals.

Advantageous Effects of Invention

According to the present invention, it is possible to synthesize signals received by a wave receiver while suppressing the number of taps of an FIR filter.

BRIEF DESCRIPTION OF DRAWINGS

FIG. 3 is a diagram illustrating an example of a data frame received by a wave receiver in the first embodiment.

DESCRIPTION OF EMBODIMENTS

Embodiments of the present invention will be described below with reference to the drawings.

Outline

Figure 1:
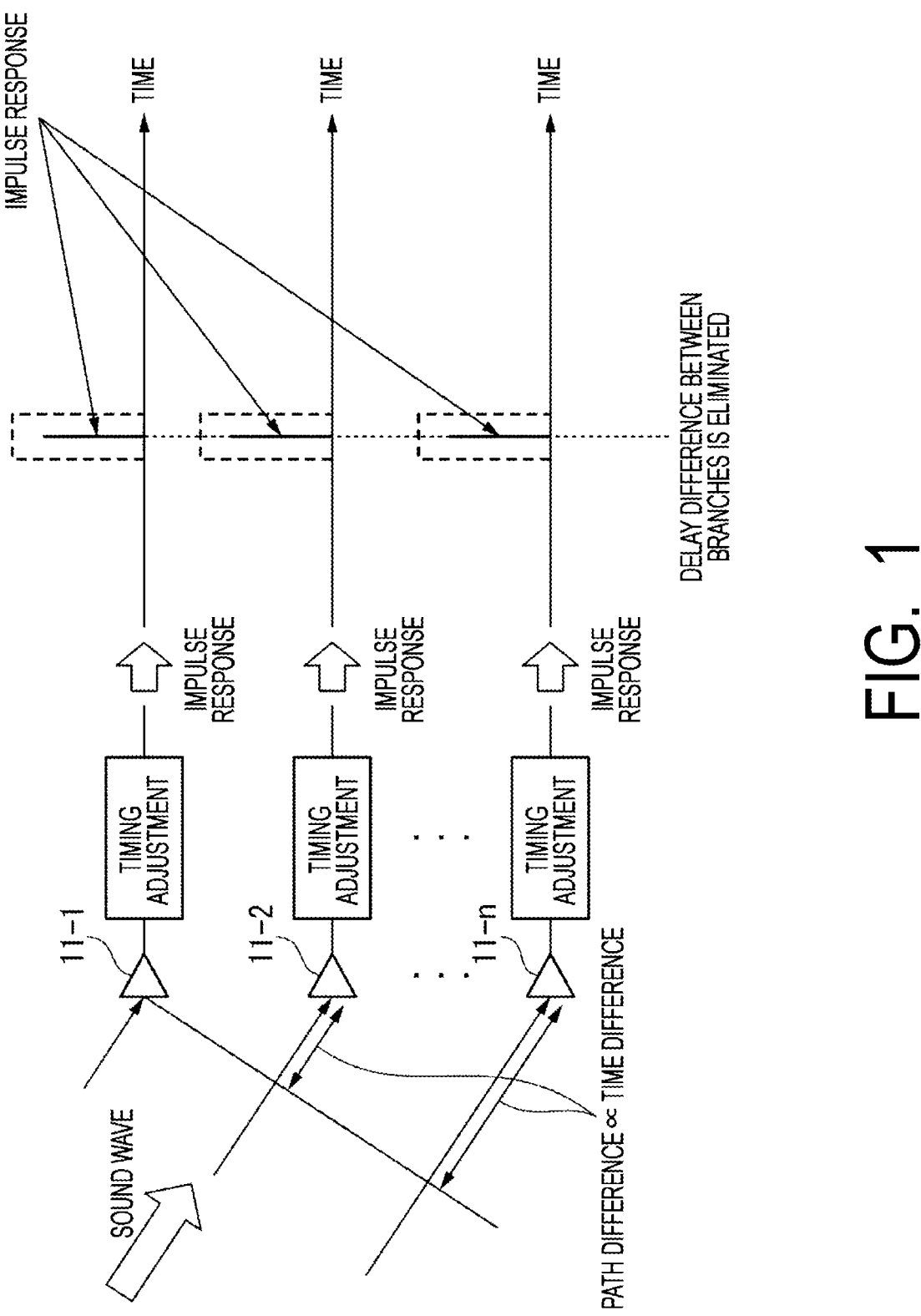
FIG. 1 is a diagram for illustrating an outline of the present invention.

FIG. 1 is a diagram illustrating an outline of the present invention. In the present invention, at a stage preceding the FIR filter, a deviation in arrival time between wave receivers 11-1 to 11-$n$ is estimated in advance based on a signal arriving front a predetermined direction, and the deviation in reception signal is adjusted based on an estimation result, By performing such timing adjustment, a deviation in arrival time caused by a path difference immediately before the FIR filter is compensated for. As a result, it is possible to eliminate apparent the arrival time difference between the wave receivers 11-1 to 11-$n$, and even in a case where the tap length of the FIR filter is shorter than the arrival time difference between the wave receivers 11-1 to 11-$n$, it is possible to synthesize sound waves in all arrival directions.

Hereinafter, a configuration for obtaining the above effect will be described.

First Embodiment

Figure 2:
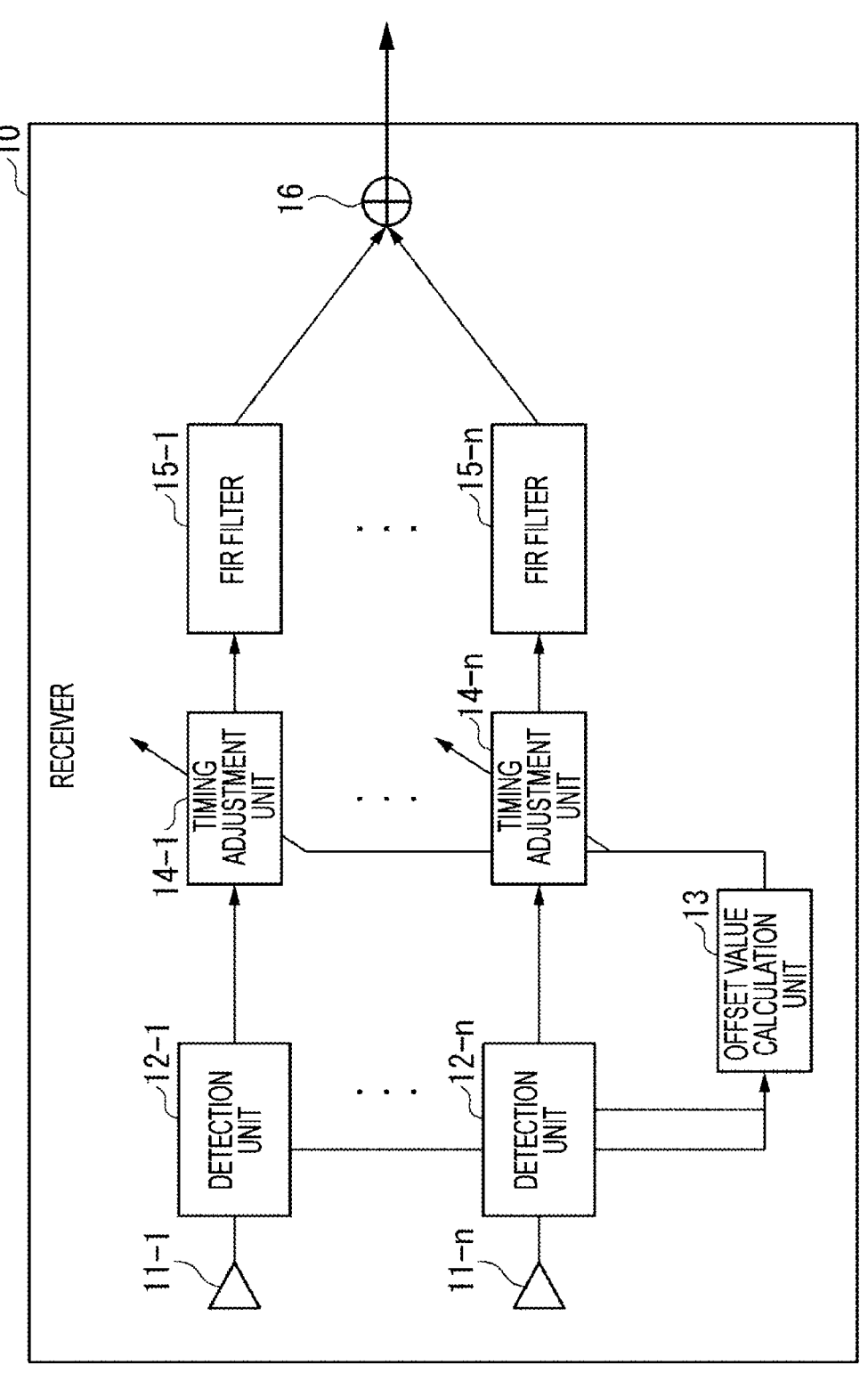
FIG. 2 is a diagram illustrating a configuration of a receiver in a first embodiment.

FIG. 2 is a diagram illustrating a configuration of a receiver 10 in a first embodiment. The receiver 10 is a receiver used for underwater acoustic communication. The receiver 10 includes a plurality of wave receivers 11-1 to 11-$n$, a plurality of detection units (a plurality of detectors) 12-1 to 12-$n$, an offset value calculation unit (offset value calculator) 13, a plurality of timing adjustment units (a plurality of adjusters) 14-1 to 14-$n$, a plurality of FIR filters (a plurality of finite impulse response (FIR) filters) 15-1 to 15-$n$, and a synthesis unit (synthesizer) 16.

The wave receivers 11-1 to 11-$n$ receive sound waves arriving from the outside. For example, the wave receivers 11 to 11-$n$ receive sound waves arriving from a direction in which a path difference occurs. The direction in which the path difference occurs is, for example, a direction other than the front direction of the wave receivers 11-1 to 11-$n$. The wave receivers 11-1 to 11-$n$ convert the received sound waves into electrical signals and output the electrical signals as reception signals to the detection units 12-1 to 12-$n$.

The detection units 12-1 to 12-$n$ detect the reception signals output from the wave receivers 11-1 to 11-$n$.

Figure 3:
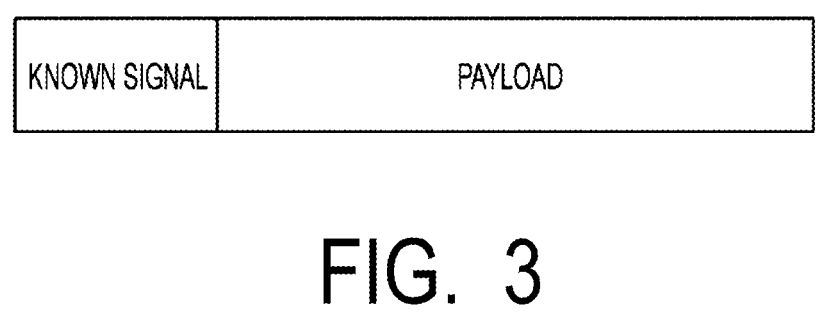

In the detection method of the reception signal, for example, a transmission-side device may add a known signal to a data frame and transmit the data frame as illustrated in FIG. 3, and detect the reception signal by detecting peaks from cross-correlation between the known signal and the received signal in the detection units 12-1 to 12-$n$. The transmission-side device may transmit a repeated known signal in a data frame, and detect the reception signal by detecting a peak from autocorrelation of the reception signal in the detection units 12-1 to 12-$n$. The reception signals detected by the detection units 12-1 to 12-$n$ are signals from a desired arrival direction.

The detection units 12-1 to 12-$n$ detect the time when the sound wave reaches the wave receivers 11-1 to 11-$n$ by detecting the known signal included in the reception signal. The detection units 12-1 to 12-$n$ output the detected time information to the offset value calculation unit 13.

The offset value calculation unit 13 calculates a deviation from the reference time for each of the reception signals detected by the detection units 12-1 to 12-$n$ based on the difference between the reference time and the arrival time of the reception signal detected by each of the detection units 12-1 to 12-$n$.

The reference time may be, for example, a time when the sound wave reaches any one of the wave receivers 11-1 to 11-$n$, a time set in advance by a user of the receiver 10, or any one of an average time, a median value, a latest time, and an earliest time of the time when the sound wave reaches the wave receivers 11-1 to 11-$n$.

The timing adjustment units 14-1 to 14-$n$ adjust the deviation (for example, advance or delay) of the reception signal from the reference time based on the deviation of each reception signal from the reference time calculated by the offset value calculation unit 13. Here, adjusting the deviation (for example, advance or delay) of the reception signal from the reference time means performing adjustment so as to reduce the deviation. For example, adjusting the deviation (for example, advance or delay) of the reception signal from the reference time means adjusting the deviation to be zero. The timing adjustment unit 14 is an aspect of an adjustment unit.

The FIR filters 15-1 to 15-_n_ receive the reception signals adjusted by the timing adjustment units 14-1 to 14-_n_ and perform FIR filtering processing. The FIR filters 15-1 to 15-_n_ may be configured such that the filter coefficients are adaptively controlled by an adaptive algorithm such as an RLS method or an LMS method, or the filter coefficients may be set based on a channel estimation result using a pilot signal. The FIR filters 15-1 to 15-_n_ may constitute a feedback filter of a decision feedback type in which a sequence obtained by symbol-determining the addition result of the outputs of the FIR filters 15-1 to 15-_n_ is input, and the output result of the feedback filter may be further added to or subtracted from the addition result of the outputs of the FIR filters 15-1 to 15-_n_. The adaptive algorithm may simultaneously control the filter coefficients of the FIR filters 15-1 to 15-_n_ and the filter coefficients of the feedback filter.

The synthesis unit 16 adds the outputs of the FIR filters 15-1 to 15-_n_. Demodulation processing including symbol determination is performed based on the addition result by the synthesis unit 16.

Figure 4:
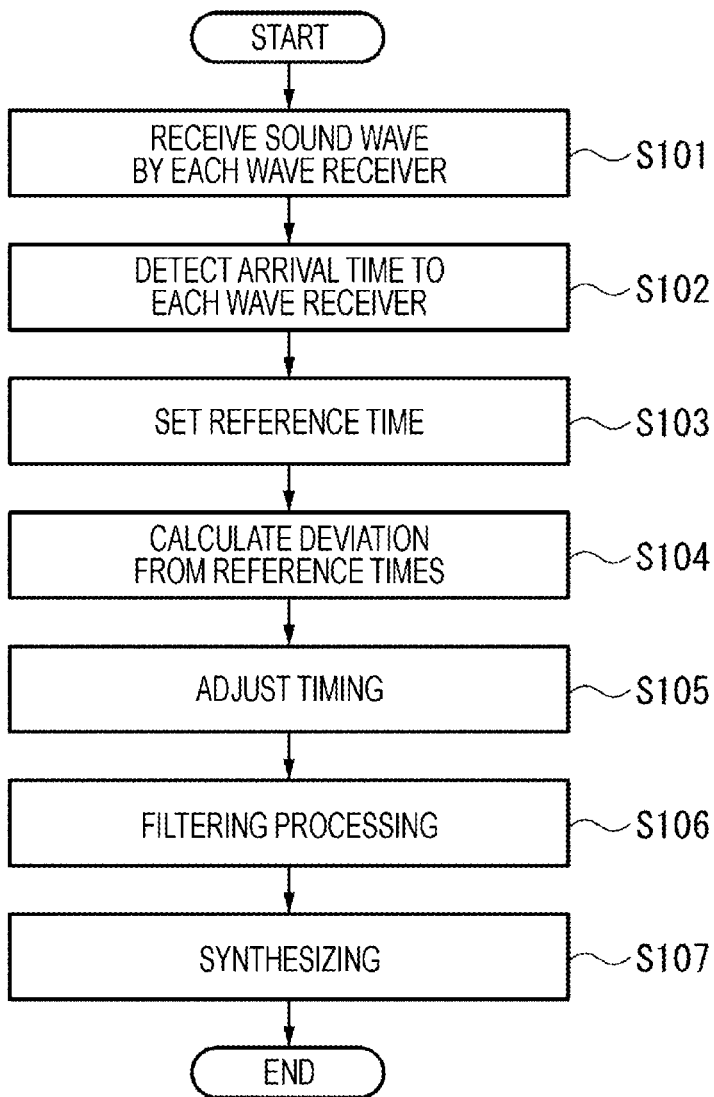
FIG. 4 is a flowchart illustrating a flow of processing of a receiver in the first embodiment according to the first embodiment.

FIG. 4 is a flowchart illustrating a flow of processing of the receiver 10 according to the first embodiment. Note that, in FIG. 4, on the assumption that the data frame illustrated in FIG. 3 is received by the receiver 10, a method of correcting the timing of the reception signal received by the wave receivers 11-1 to 11-_n_ with the arrival time of the latest data frame among the N wave receivers 11 as a reference time will be described.

The wave receivers 11-1 to 11-_n_ receive data frames (sound waves) arriving from the outside (step S101). The wave receivers 11-1 to 11-_n_ convert the received data frames (sound waves) into electrical signals and output the electrical signals as reception signals to the detection units 12-1 to 12-_n_. The detection units 12-1 to 12-_n_ detect the time when the data frame reaches the wave receivers 11-1 to 11-_n_ by detecting the known signal added to the head of the reception signals output from the wave receivers 11-1 to 11-_n_ (step S102). The detection units 12-1 to 12-_n_ output the detected time information to the offset value calculation unit 13.

Using the time information output from the detection units 12-1 to 12-_n_, the offset value calculation unit 13 compares the arrival time of the data frame among the wave receivers 11-1 to 11-_n_. The offset value calculation unit 13 sets the latest arrival time as a reference time (step S103). Based on the set reference time and the arrival times at the wave receivers 11-1 to 11-_n_, the offset value calculation unit 13 calculates the deviation of the reception signal of each wave receiver 11-_i_ (i is 1, . . . , n) from the reference time using Equation (1) below (step S104)

$$\text{Deviation from reference time} = \qquad\qquad \text{Equation (1)}$$
$$(\text{Reference time}) - (\text{Arrival time of wave receiver } 11\text{-}i)$$

The offset value calculation unit 13 outputs information on the calculated deviation from the reference time to the timing adjustment unit 14-_i_ corresponding to the wave receiver 11-_i_, For example, the offset value calculation unit 13 outputs information on a deviation between the arrival time of the data frame at the wave receiver 11-1 and the reference time to the timing adjustment unit 14-1. For example, the offset value calculation unit 13 outputs information on a deviation between the arrival time of the data frame at the wave receiver 11-_n_ and the reference time to the timing adjustment unit 14-_n_.

The timing adjustment unit 14-_i_ pads zero at the head of the data frame based on the deviation information output from the offset value calculation unit 13 (step S105). Specifically, the timing adjustment unit 14-_i_ pads zero at the head of the data frame so that the deviation indicated by the deviation information output from the offset value calculation unit 13 becomes zero. As a result, the head positions of the data frames received by all the wave receivers 11-_i_ are aligned with the reference time. The timing adjustment unit 14-_i_ outputs the adjusted data frame to the FIR filter 15-_i_.

The FIR filter 15-_i_ performs filtering processing using the output from the timing adjustment unit 14-_i_ as an input signal (step S106). The signals filtered by the FIR filer 15-_i_ are synthesized by the synthesis unit 16 (step S107). (Simulation Evaluation)

Next, the BER characteristics with respect to the number of taps of the FIR filter in a case where the correction based on the arrival time between the wave receivers 11 is performed as in the first embodiment and in a case where the correction is not performed are compared. The simulation was performed under the following condition.

Figure 5:
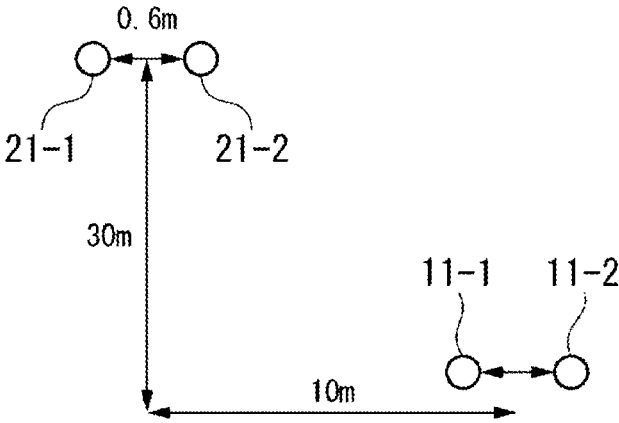
FIG. 5 is a diagram illustrating arrangement of a wave transmitter and a wave receiver during simulation.

Modulation scheme: Quadrature Phase Shift Keying (QPSK)
    Bandwidth: 200 kHz
    Center frequency: 300 kHz
    Transmission antenna: two antennas
    Reception antenna: two antennas
    Electric Bit to Noise (Eb/No): 13 dB
    Transmission method: single carrier FIG. 5 is a diagram illustrating arrangement of transmitters 21-1 and 21-2 and the wave receivers 11-1 and 11-2 during simulation. As illustrated in FIG. 5, in this simulation, BER characteristics of transmitter 21-1 are compared assuming 2×2 Multiple Input Multiple Output (MIMO). The FIR filter 15 learns an error between the known signal and the filter output as a cost by the RLS method.

Figure 6:
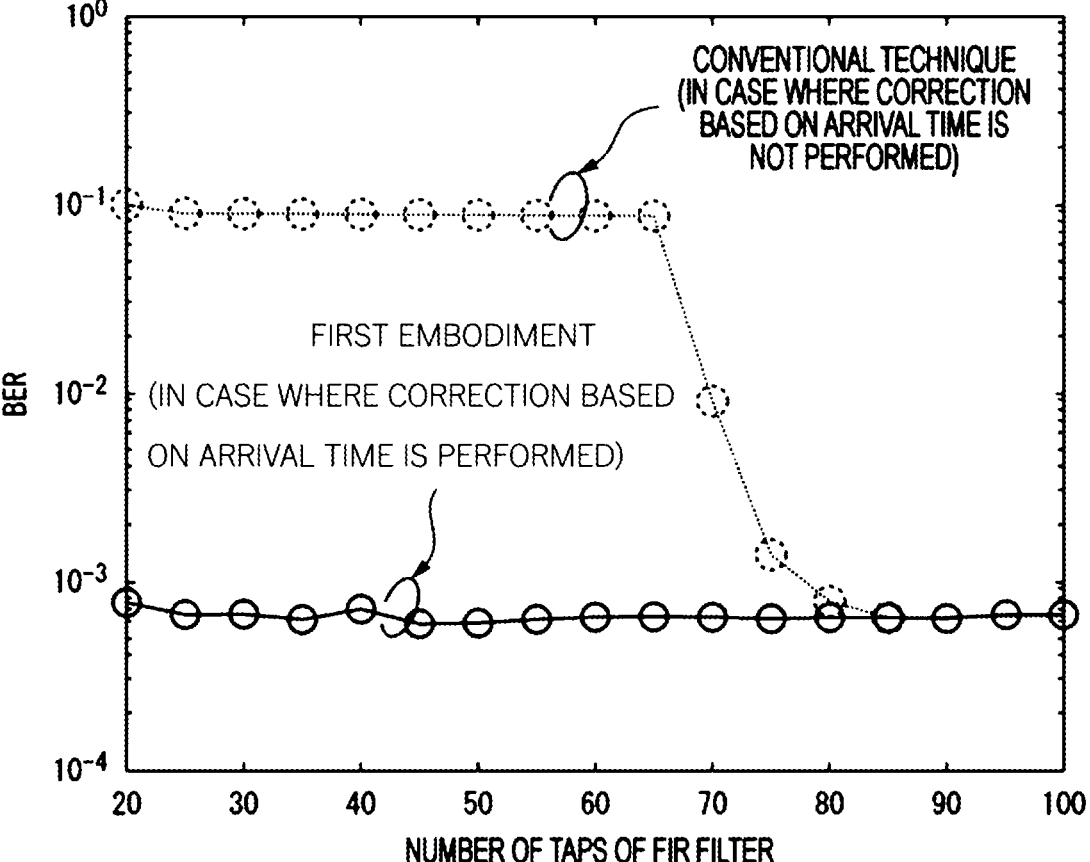
FIG. 6 is a diagram illustrating a simulation result in the first embodiment.

FIG. 6 is a diagram illustrating a simulation result in the first embodiment. In FIG. 6, the horizontal axis represents the number of taps of the FIR filter, and the vertical axis represents BER. As illustrated in FIG. 6, in a case where the correction based on the arrival time between the wave receivers 11 is performed as in the first embodiment, the BER is constant regardless of the number of taps of the FIR filter. On the other hand, in the conventional method, the BER characteristic is deteriorated when the number of taps of the FIR filter is less than 85. As described above, it can be seen that the BER characteristic of the receiver end is not deteriorated even if the tap length of the IR filter 15 is set to be short by application of the present invention.

According to the receiver 10 configured as above, the receiver 10 includes the plurality of wave receivers 11-1 to 11-_n_ that receive data frames arriving from a predetermined direction, the plurality of detection units 12-1 to 12-_n_ that are connected to the plurality of wave receivers 11-1 to 11-_n_ and detect arrival times of the data frames received by the connected wave receivers 11-1 to 11-_n_, the plurality of timing adjustment units 14-1 to 14-_n_ that adjust a deviation between arrival times of the plurality of wave receivers 11-1 to 11-_n_ based on the arrival times of the plurality of detected data frames, the plurality of FIR filters 15-1 to 15-_n_ that perform filtering processing using the adjusted data frames as input signals, and the synthesis unit 16 that synthesize output results of the plurality of FIR filters 15-1 to 15-_n_. By adjusting the deviation in arrival time in this manner, the head positions of the data frames received by the plurality of wave receivers 11-1 to 11-$n$ are aligned with the reference time. Therefore, even in a ease where the tap length of the FIR filter is shorter than the arrival time difference between the wave receivers 11-1 to 11-$n$, it is possible to synthesize sound waves in all arrival directions. With such a configuration, even if the tap length of the FIR filter is set short, the BER characteristic of the receiver end is not deteriorated. As a result, the required tap length of the FIR filter is shortened, and the operation amount can be reduced. In a case where the FIR filter is controlled by the adaptive algorithm, the convergence speed of the adaptive algorithm is improved.

The receiver 10 further includes an offset value calculation unit 13 that calculates a deviation between the arrival time of the data frame received by each of the wave receivers 11-$i$ and the reference time. The plurality of timing adjustment units 14-$i$ adjust each data frame received by each of the wave receivers 11-$i$ to reduce the deviation calculated by the offset value calculation unit 13. As a result, it is possible to reduce the deviation of the arrival time (for example, a delay) caused by the path difference. Therefore, even in a case where the tap length of the FIR filter is shorter than the arrival time difference between the wave receivers 11-1 to 11-$n$, it is possible to synthesize sound waves in all arrival directions.

The receiver 10 sets the time obtained based on the arrival times detected by the plurality of detection units 12-$i$ as the reference time. Here, the time obtained based on the arrival time is any of the time when the sound wave arrives, the time set in advance by the user of the receiver 10, the average time, the median value, the latest time, and the earliest time of the time when the sound wave arrives at the wave receivers 11-1 to 11-$n$. As a result, it is possible to set the reference time for adjusting the deviation of the arrival time caused by the path difference. As a result, the deviation in arrival time caused by the path difference can be adjusted. Therefore, even in a case where the tap length of the FIR filter is shorter than the arrival time difference between the wave receivers 11-1 to 11-$n$, it is possible to synthesize sound waves in all arrival directions.

Modification Example of First Embodiment

Figure 7:
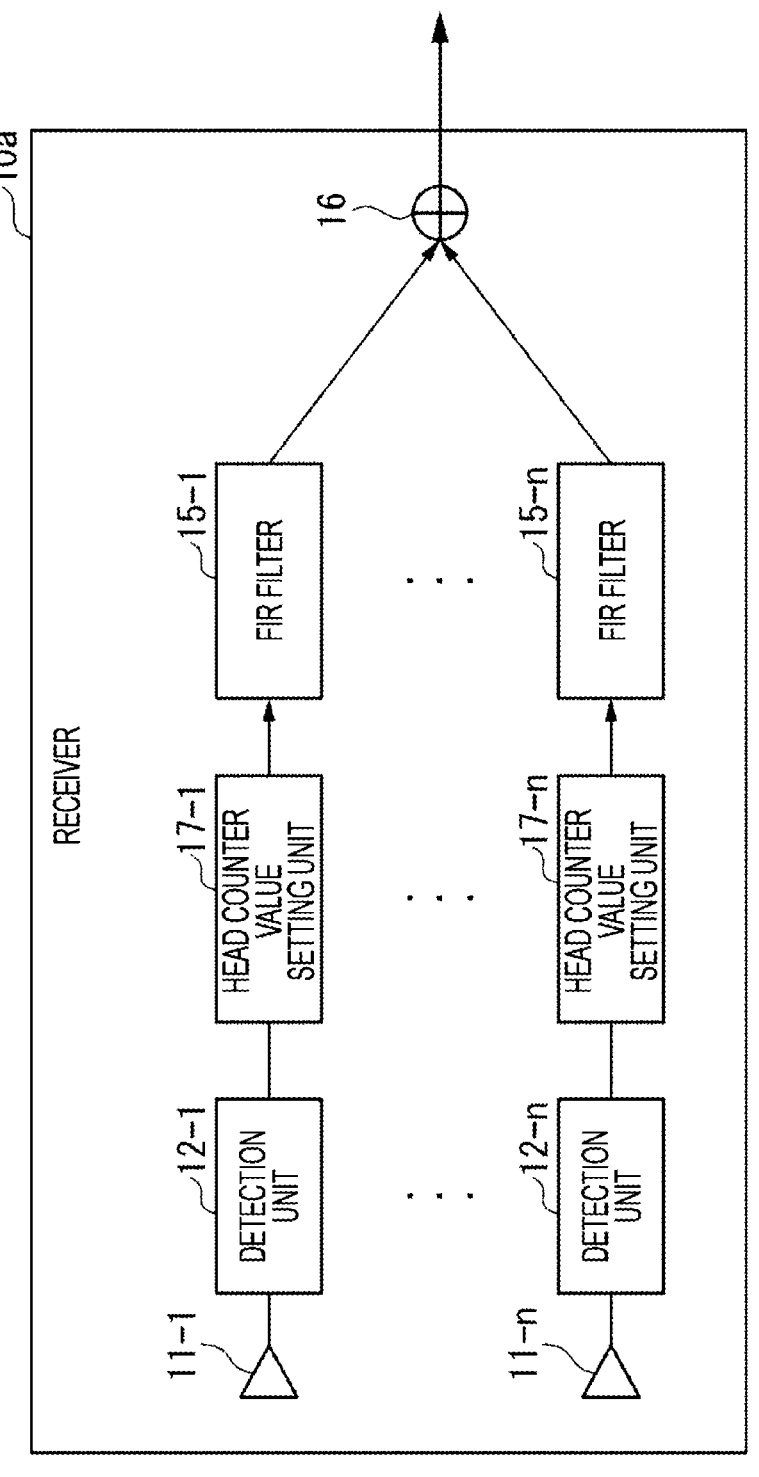
FIG. 7 is a diagram illustrating a configuration of a receiver in a modification example of the first embodiment.

The receiver 10 illustrated in FIG. 2 may be configured to include head counter value setting units (head counter value setter) 17-1 to 17-$n$ illustrated in FIG. 7 instead of the offset value calculation unit 13 and the timing adjustment units 14-1 to 14-$n$. With this configuration, it is possible to compensate for the difference in arrival time between the wave receivers 11-1 to 11-$n$ without correcting the reception signal on the time axis.

FIG. 7 is a diagram illustrating a configuration of a receiver 10$a$ in a modification example of the first embodiment. The receiver 10$a$ includes the plurality of wave receivers 11-1 to 11-$n$, the plurality of detection units 12-1 to 12-$n$, the plurality of head counter value setting units 17-1 to 17-$n$, the plurality of FIR filters 15-1 to 15-$n$, and the synthesis unit 16, The receiver 10$a$ is different from the receiver 10 in including head counter value setting units 17-1 to 17-$n$ instead of the offset value calculation unit 13 and the timing adjustment units 14-1 to 14-$n$. The other configurations of the receiver 10$a$ are similar to those of the receiver 10. Therefore, only the difference will be described.

The head counter value setting unit 17-$i$ holds the sample number of the reception signal at the head position of the data frame detected by the detection unit 12-$i$. For example, a reception signal sequence of the wave receiver 11-$i$ is set as $r_i(m)$ ($m$ is an index of time), and $m=M_i$ is a head position of the data fame. The head counter value setting unit 17-$i$ holds $M_i$. In a case of calculating the output at the time k, the head counter value setting unit 17-$i$ sets the input signal to the FIR filter 15-$i$ based on Equation (2) below using the held parameter $M_i$. The head counter value setting unit 17-$i$ is an aspect of an adjustment unit.

$$Ri(k) = (r_i(M_i + k), \ldots , r_i(M_i + k - N_i)) \qquad \text{Equation (2)}$$

In Equation (2), $N_i$ represents the number of taps of the FIR filter 15-$i$. With such a configuration, it is possible to realize processing similar to that of the first embodiment in which the correction between the wave receivers 11-$i$ is performed on the time axis.

Second Embodiment

In the first embodiment, the configuration in which the data frames received by all the wave receivers 11-$i$ are detected has been described. The second embodiment is different from the first embodiment in that some data frames of a wave receiver 11-$i$ are detected and arrival times of all wave receivers 11-$i$ are estimated based on the arrival times of the detected data frames.

Figure 8:
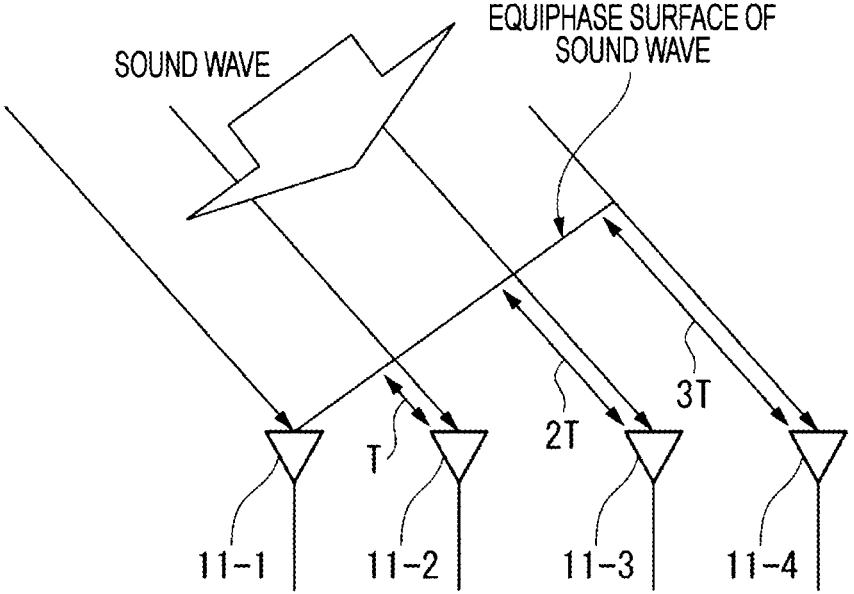
FIG. 8 is a diagram for illustrating an outline of a calculation method of a deviation from a reference time in a second embodiment.

First, a calculation method of a deviation from a reference time in the second embodiment will be described. FIG. 8 is a diagram for illustrating an outline of a calculation method of a deviation from a reference time in a second embodiment. FIG. 8 illustrates a linear array in which the wave receivers 11-1 to 11-4 are arranged in a line at equal intervals. As illustrated in FIG. 8, it is assumed that a sound wave arrives from an arrival direction in a linear array of four elements. In this case, the time difference of arrival time of the wave receiver 11-1 from the wave receiver 11-2 to the wave receiver 11-4 changes linearly.

Therefore, when the arrival time of one or more data frames of the wave receivers 11-2 to 11-4 and the positional relationship of the wave receiver 11-$i$ are known based on the arrival time of the data frame received by the wave receiver 11-1, the gradient of the arrival timing (parameter defined as T in FIG. 8) can be estimated. With such a configuration, it is possible to estimate the time when the data frame reaches all the wave receivers 11-$i$ without detecting the data frames received by all the wave receivers 11-$i$. As a result, the deviation from the reference time can be calculated without detecting the data frames received by all the wave receivers 11-$i$.

Figure 9:
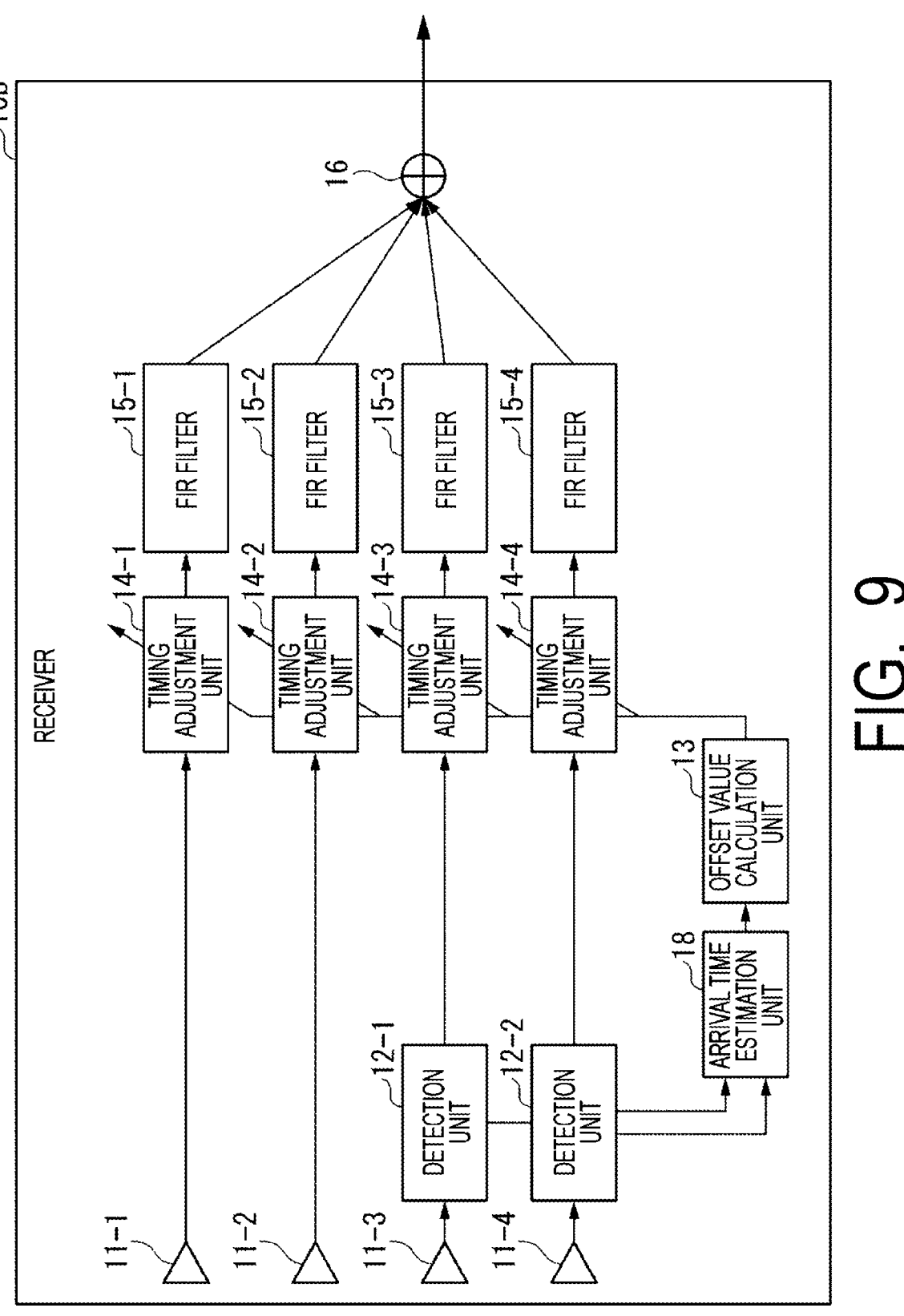
FIG. 9 is a diagram illustrating a configuration of a receiver in the second embodiment.
Figure 10:
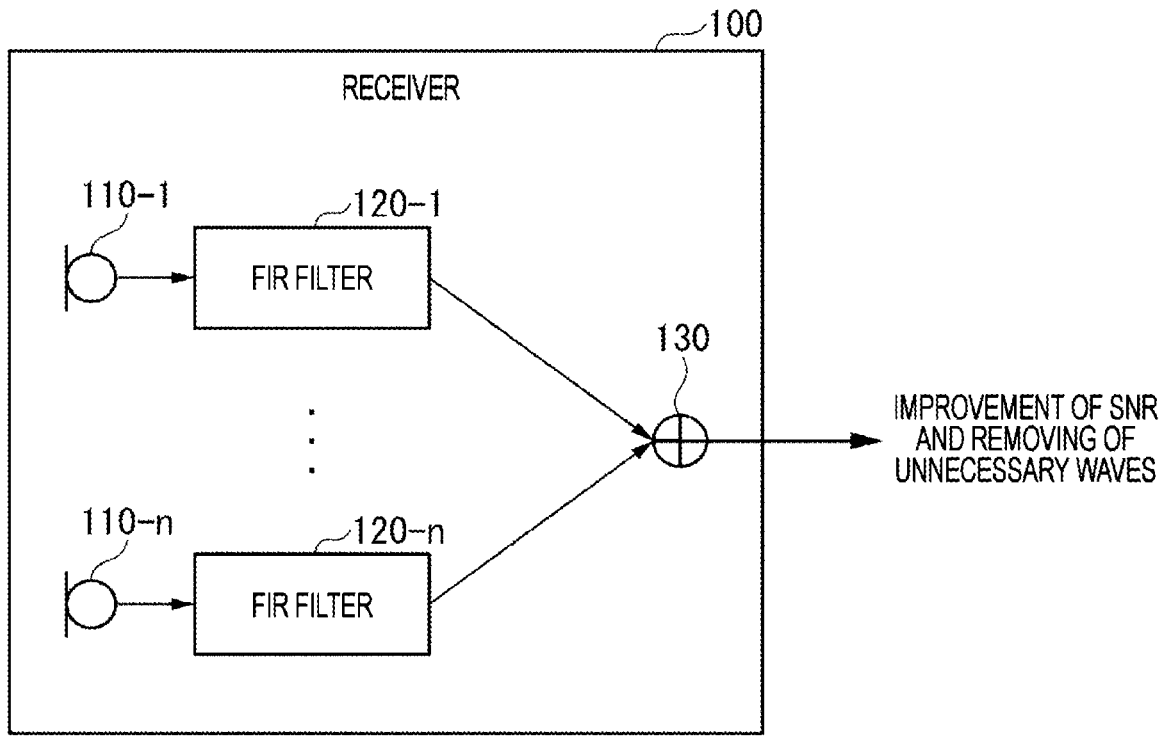
FIG. 10 is a diagram illustrating a configuration of a conventional receiver.
Figure 11:
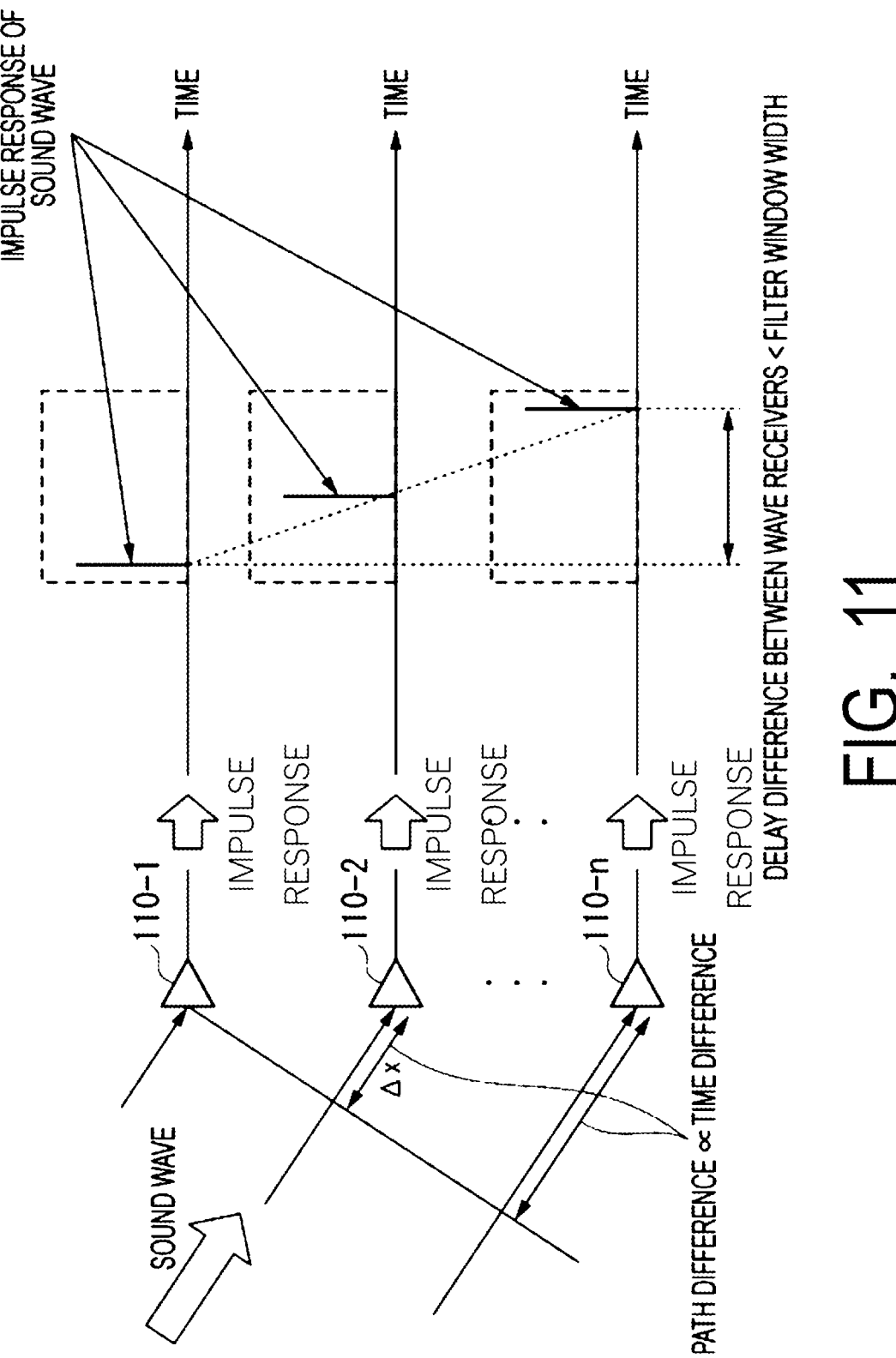
FIG. 11 is a diagram illustrating a relationship between a sound wave arriving from one arrival direction and an impulse response observed by each of wave receivers 110-1 to 110-$n$.

FIG. 9 is a diagram illustrating a configuration of a receiver 10$b$ in the second embodiment. The receiver 10$b$ is a receiver used for underwater acoustic communication. The receiver 10$b$ includes the plurality of wave receivers 11-1 to 11-4, the plurality of detection units 12-1 and 12-2, the offset value calculation unit 13, the plurality of timing adjustment units 14-1 to 14-4, the plurality of FIR filters 15-1 to 15-4, the synthesis unit 16, and an arrival time estimation unit (arrival time estimator) 18.

FIG. 9 illustrates, as an example, a configuration in which four wave receivers 11, four timing adjustment units 14, and two FIR filters 15, and two detection units 12 are provided, but the number of wave receivers 11, the timing adjustment units 14, and the number of FIR filters 15 may be three (n=3) or more and the same number may be provided. Furthermore, the number of detection units 12 may be at least 2

(n−1), which is smaller than the number of wave receivers 11, the number of timing adjustment units 14, and the number of FIR filters 15.

In FIG. 9, the detection unit 12-1 is connected to the wave receiver 11-3, and the detection unit 12-2 is connected to the wave receiver 11-4, As described above, the detection unit 12 is provided in some wave receiver 11 of the N (4 in FIG. 9) wave receivers 11. The detection units 12-1 and 12-2 detect a reception signal output from the connected wave receiver 11 (for example, the wave receivers 11-3 and 11-4). Further, the detection units 12-1 and 12-2 detect the arrival time of the data frame.

The arrival time estimation unit 18 estimates arrival times of all the wave receivers 11-*i* based on the arrival times obtained by the detection units 12-1 and 12-2. Any algorithm may be used to estimate the arrival time. For example, from the linear independence, in the Case of a linearly arranged array, the arrival times of all the wave receivers 11-*i* can be estimated theoretically based on the information of the arrival time difference of the data frames between two or more wave receivers 11-*i*. Alternatively, in the case of an array arranged in a planar manner, arrival times of all wave receivers 11-*i* in theory can be estimated based on information (for example, the arrival time difference of the wave receiver 11-2 and the arrival time difference of the wave receiver 11-3 with reference to the wave receiver 11-1) of arrival time differences of data frames between three or more wave receivers 11-*i*.

The offset value calculation unit 13 calculates a deviation from the reference time for each of the wave receivers 11-*i* based on the difference between the reference time and the arrival times of all the wave receivers 11-*i* obtained by the arrival time estimation unit 18.

According to the receiver 10*b* configured as described above, it is not necessary to detect the data frames received by all the wave receivers 11-*i*, and it is possible to greatly reduce the amount of calculation required for frame detection when using an enormous number of wave receivers 11-*i*.

The timing adjustment unit 14 may adjust a deviation in arrival time between the plurality of wave receivers 11 based on the detected arrival directions of the plurality of detected signals.

Some functional units of the receivers 10, 10*a*, and 10*b* in the above-described embodiments may be implemented by a computer. In that case, a program for implementing these functions may be recorded in a computer-readable recording medium, and the program recorded in the recording medium may be read and executed by a computer system to implement the functions. The "computer system" mentioned herein includes an OS and hardware such as a peripheral device.

The "computer-readable recording medium" refers to a portable medium such as a flexible disk, a magneto-optical disc, a ROM, or a CD-ROM, or a storage device such as a hard disk included in the computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside the computer system serving as a server or a client in that case. Also, the above program may be for implementing some of the functions described above, may be formed with a combination of the functions described above and a program already recorded in the computer system, or may be formed with a programmable logic device such as an FPGA.

As above, the embodiments of the present invention have been described in detail with reference to the drawings, however, the specific configuration is not limited to the embodiments, and includes design and the like without departing from the spirit of the present invention.

Industrial Applicability

The present invention can be applied to a technology of underwater acoustic communication.

REFERENCE SIGNS LIST

10, 10*a*, 10*b* Receiver
11-1 to 11-*n* Wave receiver
12-1 to 12-*n* Detection unit
13 Offset value calculation unit
14-1 to 14-*n* Timing adjustment unit
15-1 to 15-*n* FIR filter
16 Synthesis unit
17-1 to 17-*n* Head counter value setting unit
18 Arrival time estimation unit

The invention claimed is:

1. A receiver comprising:
a plurality of wave receivers configured to receive sound waves arriving from a predetermined direction;
a plurality of detectors that is connected to at least some of the plurality of wave receivers and detect arrival times of sound waves received by a connected wave receiver; and
a plurality of adjusters configured to adjust a deviation of the arrival times of sound waves of between the plurality of wave receivers based on arrival times a plurality of detected sound waves
wherein the receiver further comprised:
an offset value calculator is configured to calculate a deviation between the arrival time of sound waves received by each wave receiver and a reference time, wherein
the plurality of adjusters is configured to adjust each sound wave received by each of the plurality of wave receivers so as to reduce the deviation calculated by the offset value calculator.

2. The receiver according to claim 1, further comprising:
a plurality of finite impulse response (FIR) filters configured to perform filtering processing using an adjusted sound waves as an input sound waves; and
a synthesizer configured to synthesize the output results of the plurality of FIR filters.

3. The receiver according to claim 1, wherein the offset value calculator sets a time obtained based on arrival times detected by the plurality of detectors or a preset time as the reference time.

4. The receiver according to claim 1, further comprising:
an arrival time estimator configured to estimate an arrival time of a sound waves received by each wave receiver based on an arrival time of a sound waves received by the wave receiver to which the plurality of detectors are connected, wherein
the plurality of detectors is connected to a part of the plurality of wave receivers, and
the offset value calculator calculates a deviation between an arrival time of a sound waves received by each wave receiver estimated by the arrival time estimator and the reference time.

5. The receiver according to claim 1, wherein the plurality of adjusters align a header of the each sound waves by padding the heads of the sound waves with zeros based on the deviation calculated by the offset value calculator.

6. A receiving method comprising:

detecting an arrival time of sound waves received by at least two or more wave receivers among a plurality of wave receivers that receive the sound waves arriving from a predetermined direction; and adjusting a deviation of the arrival times of sounds waves of between the plurality of wave receivers based on arrival times of a plurality of detected sound waves received by at least two or more wave receivers, wherein the receiving method further comprised:

calculating a deviation between the arrival time of sound waves received by each wave receiver and a reference time, wherein the adjusting each sound wave received by each of the plurality of wave receivers so as to reduce the deviation calculated.

* * * * *